(12) United States Patent
Rozman et al.

(10) Patent No.: US 8,975,876 B2
(45) Date of Patent: Mar. 10, 2015

(54) METHOD OF CONTROLLING ROTATING MAIN FIELD CONVERTER

(71) Applicant: Hamilton Sundstrand Corporation, Windsor Locks, CT (US)

(72) Inventors: Gregory I. Rozman, Rockford, IL (US); Steven J. Moss, Rockford, IL (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 172 days.

(21) Appl. No.: 13/836,255

(22) Filed: Mar. 15, 2013

(65) Prior Publication Data

US 2014/0266079 A1 Sep. 18, 2014

(51) Int. Cl.
*H02P 9/02* (2006.01)
*H02P 9/30* (2006.01)

(52) U.S. Cl.
CPC . *H02P 9/02* (2013.01); *H02P 9/305* (2013.01)
USPC .................................. 322/28; 322/59; 322/89

(58) Field of Classification Search
USPC .............. 322/22–25, 27, 28, 59, 89; 318/606, 318/607
See application file for complete search history.

(56) References Cited

U.S. PATENT DOCUMENTS

| | | | |
|---|---|---|---|
| 3,858,109 A * | 12/1974 | Liden .............................. | 322/31 |
| 4,723,106 A * | 2/1988 | Gibbs et al. ..................... | 322/26 |
| 4,841,216 A | 6/1989 | Okada et al. | |
| 5,029,263 A | 7/1991 | Rozman | |
| 5,055,765 A | 10/1991 | Rozman et al. | |
| 5,233,286 A | 8/1993 | Rozman et al. | |
| 5,325,043 A | 6/1994 | Parro | |
| 5,363,032 A | 11/1994 | Hanson et al. | |
| 5,488,286 A | 1/1996 | Rozman et al. | |
| 5,629,606 A * | 5/1997 | Asada .............................. | 322/28 |
| 5,764,036 A | 6/1998 | Vaidya et al. | |
| 5,796,240 A * | 8/1998 | Saito et al. ...................... | 322/10 |
| 6,281,664 B1 | 8/2001 | Nakamura et al. | |
| 6,420,842 B1 | 7/2002 | Gold | |
| 7,053,590 B2 | 5/2006 | Wang | |
| 7,064,524 B2 | 6/2006 | Yao | |
| 7,196,498 B2 | 3/2007 | Yao | |
| 7,282,893 B2 | 10/2007 | Yao | |
| 7,439,713 B2 | 10/2008 | Dooley | |
| 8,237,416 B2 | 8/2012 | Rozman et al. | |
| 8,358,111 B2 | 1/2013 | Rozman et al. | |
| 8,427,116 B2 | 4/2013 | Rozman et al. | |
| 8,699,251 B2 | 4/2014 | Rozman et al. | |
| 2005/0105224 A1* | 5/2005 | Nishi .............................. | 361/18 |
| 2011/0257791 A1* | 10/2011 | Hawker et al. ................. | 700/275 |

\* cited by examiner

*Primary Examiner* — Pedro J Cuevas
*Assistant Examiner* — Sean Gugger
(74) *Attorney, Agent, or Firm* — Cantor Colburn LLP

(57) ABSTRACT

A generator system includes a generator having a stationary portion and a rotating portion. An exciter field winding and a main armature winding are disposed on the stationary portion. An exciter armature winding and a main field winding are disposed on the rotating portion. A frequency demodulator is configured to extract a frequency modulated control signal from the exciter armature winding and to demodulate the frequency modulated control signal to generate a demodulated control signal. The generator includes a main field rotating power converter to selectively control current in the main field winding in response to the demodulated command signal. The generator system includes a generator control unit in electrical communication with the generator to monitor the output voltage at the main armature winding and to output an exciter current including the frequency modulated control signal to the exciter field winding based on the output voltage.

17 Claims, 3 Drawing Sheets

METHOD OF CONTROLLING ROTATING MAIN FIELD CONVERTER

CROSS-REFERENCE TO RELATED APPLICATION(S)

Reference is made to application Ser. No. 13/833,809, entitled "GENERATOR ARCHITECTURE WITH MAIN FIELD ROTATING POWER CONVERTER", application Ser. No. 13/833,212, entitled "GENERATOR ARCHITECTURE WITH PMG EXCITER AND MAIN FIELD ROTATING POWER CONVERTER", application Ser. No. 13/836,428, entitled "EPGS ARCHITECTURE WITH MULTI-CHANNEL SYNCHRONOUS GENERATOR AND COMMON FIELD REGULATED EXCITER", application Ser. No. 13/836,007, entitled "EPGS ARCHITECTURE WITH MULTI-CHANNEL SYNCHRONOUS GENERATOR AND COMMON UNREGULATED PMG EXCITER", and application Ser. No. 13/835,089, entitled "VARIABLE SPEED CONSTANT FREQUENCY SYSTEM WITH GENERATOR AND ROTATING POWER CONVERTER", which are filed on even date herewith, are assigned to same assignee as this application, and which the entire disclosure off all above-reference applications hereby being incorporated by reference.

BACKGROUND

The present inventive concept is related to generator architectures and in particular to generator architectures utilizing main field rotating power converters.

In the simplest terms, generators convert mechanical energy to electrical energy via the interaction of rotating magnetic fields and coils of wire. A multitude of generator architectures have been developed with various means of providing interaction between magnetic fields and coils of wire. For example, a permanent magnet generator (PMG) utilizes permanent magnets to generate a constant magnetic field, which is rotated via the mechanical energy supplied by a prime mover such that the rotating magnetic field interacts with the stator coils to provide an output voltage. Another type of generator supplies current through a coil to generate the desired magnetic field, which is rotated via the mechanical energy supplied by a prime mover, such that a rotating magnetic field is created that interacts with stator coils to provide an output voltage.

In the former example, the output voltage supplied by the PMG depends only on the magnitude of the mechanical energy supplied by the prime mover. In the latter example, the output voltage of the generator can be regulated by varying the current supplied to the field coil. For applications in which the output voltage must be regulated, the latter example, known as a wound field synchronous machine, is widely utilized. A PMG is sometimes utilized in conjunction with the wound field synchronous machine to source the current supplied to an exciter field winding to regulate the output of the brushless wound field synchronous machine.

For example, in aircraft applications, a typical variable frequency generator (VFG) includes a permanent magnet section, an exciter section, and a main generator section. The permanent magnet portion includes permanent magnets employed on the rotating portion, which generate an alternating current voltage on the stator portion. The AC voltage provided by the permanent magnet portion is rectified and selectively applied to the exciter field winding on the stationary portion of the exciter. The exciter field current interacts with the rotating exciter armature windings to provide an AC voltage. A rotating rectifier rectifies the AC voltage and supplies the DC voltage to a main field winding on the rotating portion of the main generator section. Rotation of the motive power shaft and the main field winding induces three-phase AC output voltage on the main generator armature windings. The magnitude of the AC generator output voltage is regulated by controlling the current supplied to the exciter field coil on the stationary portion of the exciter. On characteristic of this architecture is that the output of the generator may be a function of the rotational speed of the generator and load. In cases with a belt-type interface between prime mover shaft and the generator shaft sudden load changes may also result in sudden changes in generator speed. As a result, sudden variations of the generator output voltage, such as sudden voltage increases, may occur.

SUMMARY

According to at least one embodiment of the disclosure, a generator system includes a generator having a stationary portion and a rotating portion. An exciter field winding and a main armature winding are disposed on the stationary portion. An exciter armature winding and a main field winding are disposed on the rotating portion. A frequency demodulator is configured to extract a frequency modulated control signal from the exciter armature winding and to demodulate the frequency modulated control signal to generate a demodulated control signal. The generator includes a main field rotating power converter to selectively control current of the main field winding in response to the demodulated command signal. The generator system includes a generator control unit in electrical communication with the generator to monitor the output voltage at the main armature winding and to output an exciter current including the frequency modulated control signal to the exciter field winding based on the output voltage.

In another embodiment of the disclosure, a generator comprises a stationary portion and a rotation portion that rotates with respect to the stationary portion. The stationary portion includes an exciter field winding and a main armature winding. The rotating portion includes an exciter armature winding, and a main field winding. A frequency demodulator is in electrical communication with the exciter armature winding. The frequency demodulator is configured to extract a frequency modulated control signal from the exciter armature winding and to demodulate the frequency modulated control signal to generate a demodulated control signal. A main field rotating power converter is interposed between the rotating DC bus and the main field winding. The main field rotating power converter is configured to selectively control current of the main field winding in response to the demodulated command signal.

In yet another embodiment, a method of controlling a generator comprises selectively superimposing a frequency modulated control signal on an exciter current to generate a combined exciter signal. The method further includes transmitting the combined exciter current signal across an air gap to the generator. The method further includes extracting the frequency modulated control signal from the combined exciter signal and demodulating the frequency modulated control signal to generate a demodulated control signal. The method further includes controlling the generator based on the demodulated control signal.

DETAILED DESCRIPTION

Figure 1:
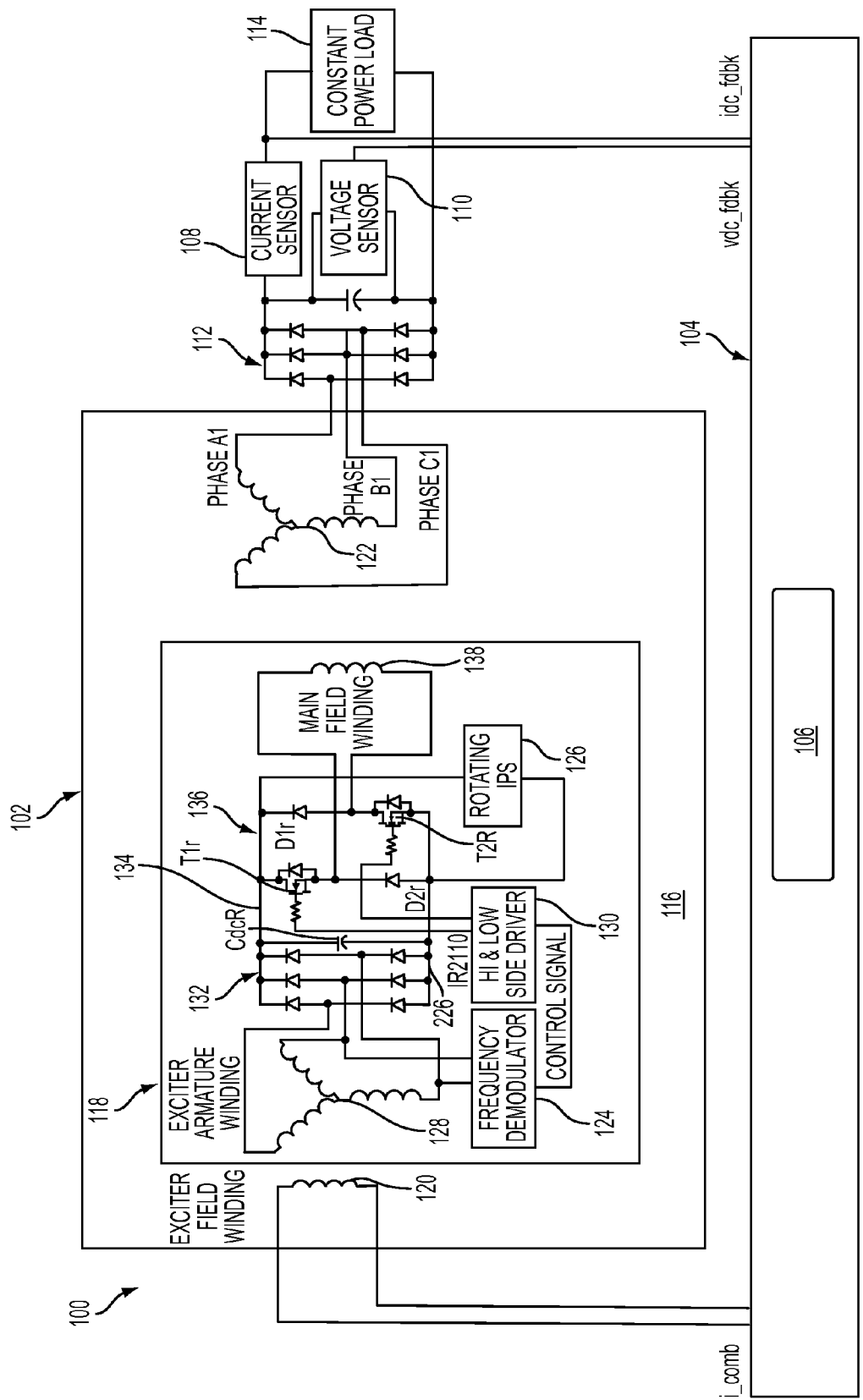
FIG. 1 is a circuit diagram of an electric power generation and distribution system according to an embodiment of the present inventive concept.

FIG. 1 is a circuit diagram of electric power generation and distribution system 100 according to an embodiment of the present inventive concept. System 100 includes generator 102 and a generator control unit (GCU) 104. The GCU 104 includes an exciter converter module 106. At the output side of the generator 102, the system 100 may further include a current sensor 108, a voltage sensor 110, an output rectifier 112, and load including a constant power load 114. The output rectifier 112 may rectify the AC voltage at the main armature winding 122 to deliver a rectified DC voltage to the load including a constant power load 114. The current sensor 108 and the voltage sensor 110 may provide current and voltage feedback signals to the GCU.

Generator 102 includes stationary portion 116 and rotating portion 118. The stationary portion 116 includes exciter field winding 120 and main armature winding 122. Rotating portion 118 includes, demodulator 124, rotating power source 126, exciter armature winding 128, hi-side/low-side gate driver 130, rotating rectifier 132, rotating DC bus 134, main field rotating power converter 136, and main field winding 138. Main field rotating power converter 136 includes hi-side switch T1r, low-side switch T2r, and diodes D1r and D2r.

Generator control unit (GCU) 104 and the exciter converter module 106 are configured to electrically regulate and protect of generator 102. Regulation refers to maintaining the output voltage of generator 102 provided by main armature winding 122 T1r at a desired level. Protection refers, at least in part, to preventing faults such as overvoltage faults from damaging generator 102 or attached loads 114. As discussed in more detail below, the output voltage is regulated by either regulating the current supplied to exciter field winding 128 (as is normally done in brushless wound field synchronous machines) or regulating the current supplied to main field winding 138 located on the rotating portion 118 of generator 102. Regulation of the output voltage via control the current supplied to main field winding 138 requires communication of commands/instructions/feedback across the air gap separating stationary winding 116 from rotating portion 118. Likewise, overvoltage protection is provided by communicating commands/instructions across the air gap separating stationary winding 116 from rotating portion 118. As discussed in more detail below, based on the received instructions/commands, main field rotating power converter 136 selectively applies voltage to main field winding 138.

In the embodiment shown in FIG. 1, GCU 104 is in electrical communication with the generator 102 to monitor the output voltage provided by the main armature winding 122. As mentioned above, the GCU 104 includes the exciter converter module 106, which may generate the exciter signal (i.e., current) to exciter field winding 120. Excitation supplied to exciter field winding 120 induces an AC voltage in exciter armature winding 128 located on rotating portion 116. The AC voltage generated on exciter armature winding 128 is rectified by the rotating rectifier 132 to generate a DC voltage that is supplied to main field rotating power converter 136 via DC bus link 134. The rotating rectifier 132 may include a 6-pulse passive rectifier comprised of a plurality of bridge-connected diodes. In other embodiments, the rotating rectifier 132 may be an active rectifier in which the diodes are connected in parallel with a plurality of solid-state switches selectively controlled to provide a DC output to main field rotating power converter 136. When at least one of the hi-side switch T1r or the low-side switch T2r is switched on, main field rotating power converter 136 selectively applies voltage from rotating DC bus 134 to main field winding 138, allowing current to build up in main field winding 138. When hi-side switch T1r and low-side switch T2r are switched Off, current in main field winding 138 flows through diodes D1r and D2r and voltage across main field winding becomes negative. This causes the main field current to decrease rapidly to zero. The inductive energy is fed back to the rotating dc power supply that includes an exciter armature windings, a 6-pulse rectifier, and a dc bus capacitor CdcR. Current through main field winding 138 induces an AC voltage in main armature winding 122 that is monitored by GCU 104 and supplied to load 114.

The state of the hi-side switch T1r and low-side switch T2r included with the main field rotating power converter 136 is based on frequency modulated feedback/commands received by the exciter armature winding 128. The frequency modulated feedback/commands are superimposed on the exciter signal applied to the exciter field winding 120 via the 106, and are communicated across the air gap to the exciter armature winding 128, as discussed in greater detail below.

The frequency demodulator 124 is electrically coupled to the exciter armature winding 128 and extracts the frequency modulated feedback/commands therefrom. The frequency demodulator 124 modulates, i.e., decodes the extracted frequency modulated feedback/commands and provides the demodulated commands to the hi-side/low-wide gate driver 130. Based on the demodulated commands, the selectively hi-side/low-wide gate driver 130 controls the state of switches T1r and T2r, i.e., turns switches T1r/T2r On and Off accordingly. During normal operation, for example, low-side switch T2r remains in the On state, and only hi-side switch T1r is modulated On and Off However, if an overvoltage condition is detected then low-side switch T2r may be commanded to the Off position (along with hi-side switch T1r) to prevent voltage from being supplied to main field winding 138 and to quickly reduce current in main field winding 138.

As mentioned above, the main field rotating power converter 136 may provide overvoltage protection to generator 102. The typical response to an overvoltage condition is to remove the excitation, i.e., excitation current, from exciter field winding 120. However, the lag between the time in which excitation is removed from exciter field winding 128 and when excitation is removed from main field winding 138 (which controls the output voltage on main armature winding 122) may result in voltages that are damaging to generator 102 and/or load 114. By leveraging both the hi-side switch T1r and the low-side switch T2r, the main field rotating power converter 136 may be utilized to provide protection, while the GCU 104 selectively controls the supply of current provided to exciter field winding 128 to regulate the output voltage provided by main armature winding 122. The voltage induced in response to the exciter field winding current is provided without regulation by main field rotating power converter 136 to main field winding 138, allowing current to build up in main field winding 138. In response to an overvoltage condition detected by GCU 104, a command is superimposed on the exciter current and communicated to the exciter armature winding, and ultimately received by the hi/low driver 130 to switch off the hi-side switch T1r and the low-side switch T2r and remove excitation from main field winding 138.

The system 100 may also allow for both protection and regulation of the main field winding current. For instance, the hi-side switch T1r, low-side switch T2r of the main field rotating power converter 136 is configured to allow the current through main field winding 138 to be regulated, as opposed to simply being selective switched On or Off for protection purposes. Referring to the main field converter 136, switches T1r and T2r, as well as diodes D1r and D2r are configured as an asymmetric H-bridge circuit in which voltage supplied by rotating rectifier 132 is provided to main field winding 138 when both switches T1r and T2r are On and prevented from being supplied to main field winding 138 when both switches T1r and T2r are Off. The current through main field winding 138 is regulated by maintaining switch T2r in an On state and pulse width modulating switch T1r.

Figure 2:
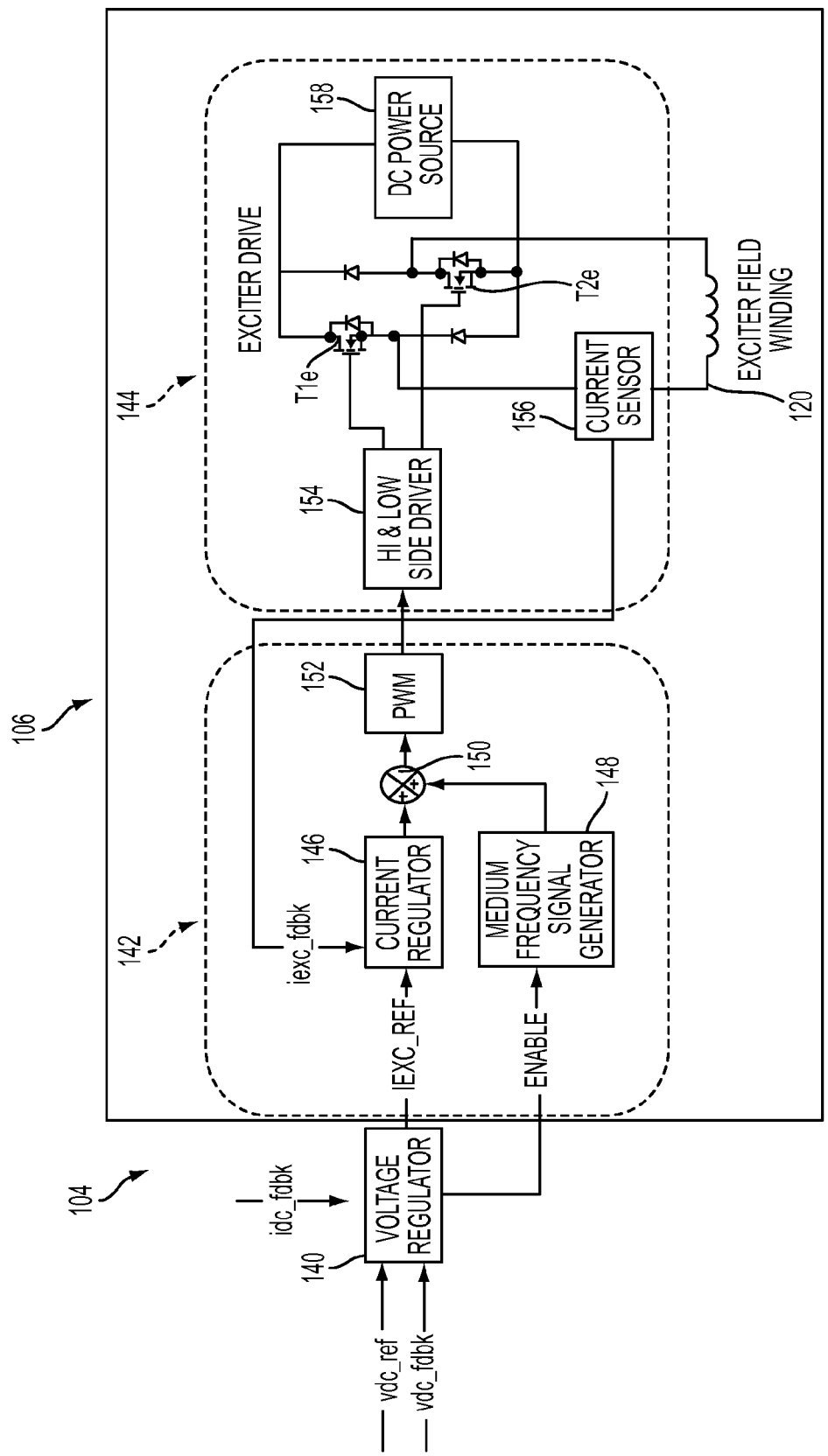
FIG. 2 is a block diagram of a generator control unit according to an embodiment of the disclosure.

Referring to FIG. 2, a voltage regulator 140 may be included with the GCU 104, which communicates with the exciter converter module 106 to enable regulation of current through main field winding 138. The voltage regulator 104 outputs reference and controls signals to the 104 utilized by the exciter converter module 106. More specifically, the output current is monitored via current sensor 108. The current sensor 108 outputs a feedback current signal (idc_fdbk) to the voltage regulator 140. In addition, voltage sensor 110 outputs a feedback voltage signal (vdc_fdbk). The vdc_fdbk is indicative of the DC output voltage across the output rectifier 112, which is received by the voltage regulator 140. The voltage regulator 140 determines a reference DC reference voltage (vdc_ref) and outputs a reference exciter current (iexc_ref) that indicates the desired current through main field winding 138. The voltage regulator 140 further generates an enable signal (enable) used to initiate the operation of superimposing the frequency modulated control signal on the exciter field winding current.

Still referring to FIG. 2, the exciter converter module 106 includes an exciter current generator circuit 142 and an exciter driver circuit 144. The exciter current generator circuit 142 includes a current regulator 146, a medium frequency signal generator 148, a summer 150, and a pulse width modulator (PWM) 152. The exciter driver circuit 144 includes an exciter hi/low driver 154, a first exciter switch T1e, a second exciter switch T2e, and an exciter current sensor 156. An independent power source (IPS) 158, such as a DC power supply, may also be included to provide an operating voltage to the exciter switches T1e, T2e. The current sensor is electrically connected to the exciter field winding and outputs an exciter current feedback signal (iexc_fdbk) to the current regulator 146, which may be used to regulate the exciter current applied to the exciter field winding.

The exciter converter module 106 may regulate the current supplied to exciter field winding 120 based on the iexc_fdbk to maintain a constant current. More specifically, the exciter converter 106 includes first and second switches T1e, T2e, and diodes D1e, D2e, connected in an asymmetric H-bridge configuration. The PWM 152 modulates switch T1e to regulate the current supplied to exciter field winding 120. As discussed above, in an asymmetric H-bridge converter, switch T2e remains On while switch T1e is modulated On and Off to regulate the current supplied to exciter field winding 120. Although an asymmetric H-bridge converter is shown, in other embodiments, other well-known converter circuits may be used to regulate the current supplied to exciter field winding 120. In this way, exciter converter circuit 106 regulates the exciter field current to provide a constant DC power supply provided by exciter armature winding 128 that is independent of generator speed.

If the voltage regulator 104 detects an overvoltage event based on a comparison between the vdc_ref and vdc_fdbk, the voltage regulator 104 outputs enable to the medium frequency signal generator 148. In response to enable, the medium frequency signal generator 148 generates a frequency modulated control signal commanding the switches to turn off. The frequency modulated control signal is added to the iexc_ref signal, which is pulse width modulated via the PWM 152 to the exciter hi/low driver 154. The exciter hi/low driver 154 applies to the combined exciter signal i_combined (i.e., the exciter current superimposed with the frequency modulated control signal) to the exciter field winding 120.

As discussed above, the frequency demodulator 124 extracts the frequency modulated feedback/commands from the exciter armature winding 128, and modulates, i.e., decodes the extracted frequency modulated feedback/commands to obtain the demodulated commands. In response to the demodulated commands, the main field rotating power converter 136 turns Off, thereby cutting off the rectified DC voltage to the main field winding 138. In addition, upon being switched Off, main field rotating power converter 136 may be configured to quickly reduce current to zero in main field winding 138. Accordingly, the monitored current does not have to be communicated across the air gap to the GCU, and command instructions may subsequently be provided by the GCU in response to the monitored current, while the numerous components required to construct conventional transformers for communicating command instructions across the air gap to the main field winding 138 may be eliminated.

Figure 3:
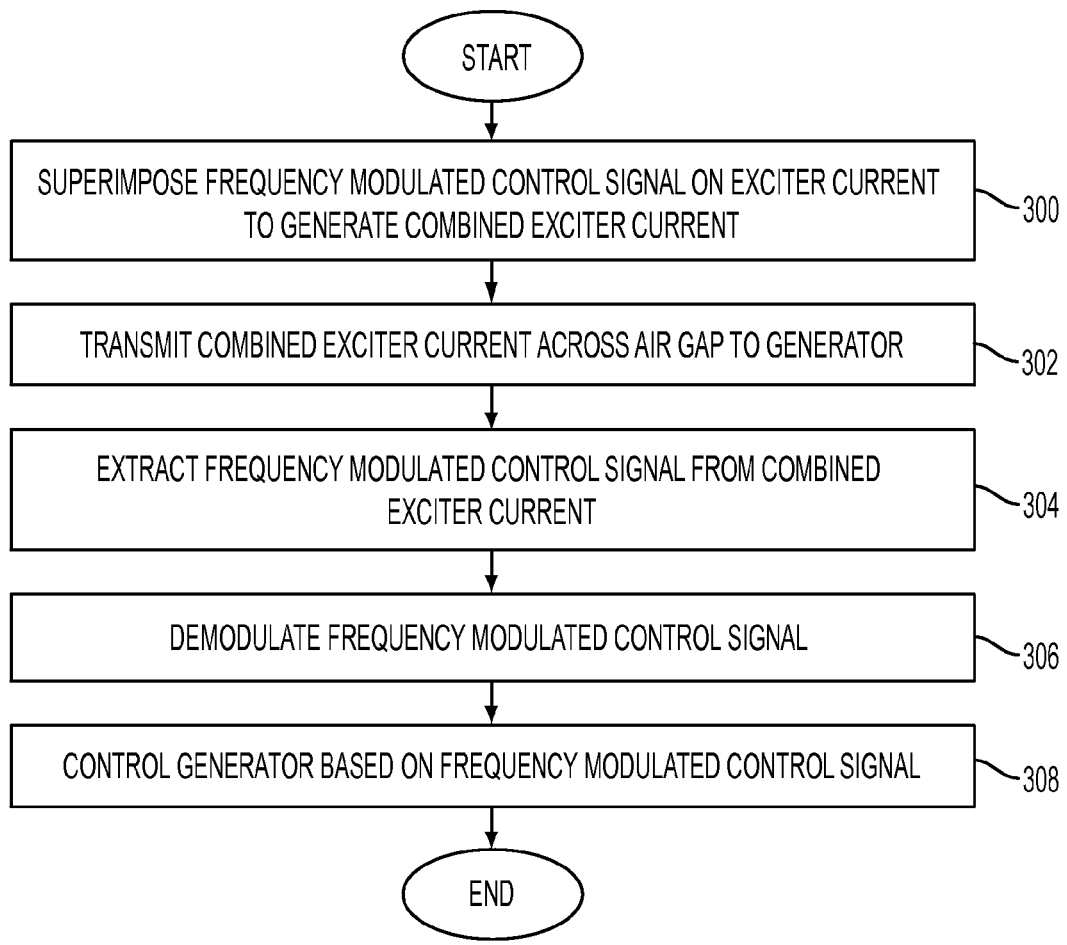
FIG. 3 is a flow diagram illustrating a method of controlling a generator according to an embodiment of the disclosure.

Referring now to FIG. 3, a flow diagram illustrates a method of controlling a generator according to an embodiment of the disclosure. At operation 300, a frequency modulated control signal is superimposed on an exciter current to generate a combined exciter signal. At operation 302, the combined exciter current signal is transmitted across an air gap to the generator. At operation 304, the frequency modulated control signal is extracted from the combined exciter signal. The frequency modulated control signal is demodulated to generate a demodulated control signal at operation 306. At operation 308, the generator is controlled based on the demodulated control signal, and the method ends.

While the present inventive concept has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present general inventive concept not be limited to the particular embodiment(s) disclosed, but that the present general inventive concept will include all embodiments falling within the scope of the appended claims.

What is claimed is:
1. A generator system comprising:
a generator having a stationary portion and a rotating portion, the generator further comprising:
an exciter field winding and a main armature winding disposed on the stationary portion;
an exciter armature winding and a main field winding disposed on the rotating portion;
a frequency demodulator in electrical communication with the exciter armature winding, the frequency demodulator configured to extract a frequency modulated control signal from the exciter armature winding and to demodulate the frequency modulated control signal to generate a demodulated control signal; and
a main field rotating power converter disposed on the rotating portion of the generator, the main field rotating power converter configured to selectively control current in the main field winding in response to the demodulated command signal; and a generator control unit in electrical communication with the generator to monitor the output voltage at the main armature winding and to output an exciter current including the frequency modulated control signal to the exciter field winding based on the output voltage.

2. The generator system of claim 1, wherein the generator control module comprises:

a voltage regulator to detect an overvoltage event based on a comparison between the output voltage and a predetermined reference voltage threshold; and an exciter converter module that superimposes the frequency modulated control signal on the exciter current in response to detecting the overvoltage event.

3. The generator system of claim 2, wherein the exciter converter module comprises:

an exciter current generator circuit in electrical communication with the voltage regulator, the exciter current generator configured to output the exciter current and an enable signal to initiate generation of the frequency modulated control signal; and an exciter driver circuit in electrical communication with the exciter current generator to generate the frequency modulated control signal in response to receiving the enable signal and to superimpose the frequency modulated control signal on the exciter current.

4. The generator system of claim 3, wherein the exciter driver circuit further includes an exciter current sensor coupled to the exciter field winding to output an exciter current feedback signal, the exciter current generator controlling the exciter current based on the exciter current feedback signal.

5. The generator system of claim 4, wherein the main field rotating power converter further comprises:

a high-side switch connected between a positive DC voltage of a rotating DC bus and a high side of the main field winding;

a low-side switch connected between a negative DC voltage of the rotating DC bus and a low side of the main field winding;

a first diode connected between the high side of the main field winding and the negative DC voltage; and a second diode connected between the low side of the main field winding and the positive DC voltage.

6. The generator system of claim 5, wherein the high-side switch and the low-side switch deliver voltage via the rotating DC bus to the main field winding in response to the being enabled.

7. The generator system of claim 6, wherein the first and second diodes provide path of current stored in the main field winding in response to the high-side switch and the low-side switch being disabled to the rotating power supply.

8. The generator of claim 7, wherein the main field rotating power converter regulates current through the main field winding by enabling the low-side switch and disabling the high-side switch.

9. A generator, comprising:

a stationary portion including exciter field winding and a main armature winding;

a rotating portion that rotates with respect to the stationary portion, the rotating portion including an exciter armature winding, and a main field winding;

a frequency demodulator in electrical communication with the exciter armature winding, the frequency demodulator configured to extract a frequency modulated control signal from the exciter armature winding and to demodulate the frequency modulated control signal to generate a demodulated control signal;

a main field rotating power converter interposed between the rotating DC bus and the main field winding, the main field rotating power converter configured to selectively control current in the main field winding in response to the demodulated command signal.

10. The generator system of claim 9, wherein the main field rotating power converter further comprises:

a high-side switch connected between a positive DC voltage of a rotating DC bus and a high side of the main field winding;

a low-side switch connected between a negative DC voltage of the rotating DC bus and a low side of the main field winding;

a first diode connected between the high side of the main field winding and the negative DC voltage; and a second diode connected between the low side of the main field winding and the positive DC voltage.

11. The generator system of claim 10, wherein the high-side switch and the low-side switch deliver voltage via the rotating DC bus to the main field winding in response to the being enabled.

12. The generator system of claim 11, wherein the first and second diodes provide path of current stored in the main field winding in response to the high-side switch and the low-side switch being disabled to the rotating power supply.

13. The generator of claim 12, wherein the main field rotating power converter regulates current through the main field winding in response to enabling the low-side switch and disabling the high-side switch.

14. A method of controlling a generator, the method comprising:

selectively superimposing a frequency modulated control signal on an exciter current to generate a combined exciter signal;

transmitting the combined exciter current signal across an air gap to the generator;

extracting the frequency modulated control signal from the combined exciter signal and demodulating the frequency modulated control signal to generate a demodulated control signal; and controlling the generator based on the demodulated control signal.

15. The method of claim 14, further comprising regulating the output of the generator based on the exciter current, while controlling the generator based on the demodulated control signal.

16. The method of claim 15, further comprising enabling at least one switch via the demodulated control signal to output voltage from the generator based on the demodulated control signal.

17. The generator system of claim 16, further comprising disabling the at least one switch via the demodulated control signal to dissipate current stored in the generator.

* * * * *